(12) United States Patent
Henderson et al.

(10) Patent No.: US 9,998,161 B2
(45) Date of Patent: Jun. 12, 2018

(54) WIRELESS COMMUNICATION DEVICE

(75) Inventors: Jim Henderson, Fife (GB); Mark Grossi, Dundee (GB)

(73) Assignee: NCR Corporation, Atlanta, GA (US)

( * ) Notice: Subject to any disclaimer, the term of this patent is extended or adjusted under 35 U.S.C. 154(b) by 980 days.

(21) Appl. No.: 13/023,633

(22) Filed: Feb. 9, 2011

(65) Prior Publication Data

US 2012/0202426 A1    Aug. 9, 2012

(51) Int. Cl.
*H04B 7/00* (2006.01)
*H04B 1/16* (2006.01)

(52) U.S. Cl.
CPC ..................... *H04B 1/16* (2013.01)

(58) Field of Classification Search
USPC ......................................................... 455/41.2
See application file for complete search history.

(56) References Cited

U.S. PATENT DOCUMENTS

| | | | | |
|---|---|---|---|---|
| 6,697,944 B1* | 2/2004 | Jones | ...................... | G06F 21/10 705/50 |
| 2003/0097655 A1* | 5/2003 | Novak | ................ | G06Q 20/3821 725/31 |
| 2005/0114205 A1* | 5/2005 | Nelson | .................... | G06F 21/10 705/14.47 |
| 2006/0190413 A1* | 8/2006 | Harper | ........................... | 705/65 |
| 2006/0200413 A1* | 9/2006 | Kessel | .................. | G06Q 30/02 705/50 |
| 2006/0235798 A1* | 10/2006 | Alkove | .................. | G06F 21/10 705/59 |
| 2007/0005775 A1* | 1/2007 | Philips | .......................... | 709/227 |
| 2007/0027814 A1* | 2/2007 | Tuoriniemi | ..................... | 705/59 |
| 2007/0149125 A1* | 6/2007 | Bremner et al. | ............. | 455/41.2 |
| 2007/0219917 A1* | 9/2007 | Liu et al. | ......................... | 705/59 |
| 2007/0239608 A1* | 10/2007 | Elbring | .................. | G06F 21/10 705/51 |
| 2007/0271184 A1* | 11/2007 | Niebert et al. | .................. | 705/51 |
| 2008/0005025 A1* | 1/2008 | Legere et al. | .................. | 705/51 |
| 2008/0097775 A1* | 4/2008 | Kim | ................................. | 705/1 |
| 2008/0103976 A1* | 5/2008 | Read et al. | ..................... | 705/59 |
| 2008/0103977 A1* | 5/2008 | Khosravy et al. | ............. | 705/59 |
| 2008/0228821 A1* | 9/2008 | Mick et al. | ................. | 707/104.1 |
| 2008/0256646 A1* | 10/2008 | Strom et al. | ..................... | 726/29 |
| 2009/0007222 A1* | 1/2009 | Jung | ....................... | G06F 21/10 726/1 |
| 2009/0117846 A1* | 5/2009 | Mavrakakis | ................. | 455/3.06 |

(Continued)

*Primary Examiner* — Erica Fleming-Hall
(74) *Attorney, Agent, or Firm* — Harden E. Stevens, III; Schwegman, Lundberg & Woessner

(57) ABSTRACT

A wireless communication device which stores and transfers entire digital media files for later use at transfer speeds compliant with the 60 GHz wireless standard. An example wireless communication device includes a receiver for wirelessly receiving an entire digital media file and associated usage rights from a kiosk while the receiver is within a wireless reception range of the kiosk, a memory for storing the digital media file and the associated usage rights, transfer circuitry for transferring the digital media file and the associated usage rights, and a controller for operating the receiver to receive the entire digital media file and associated rights, for storing the digital media file for later playing, and for operating the transfer circuitry to transfer the digital media file and associated rights.

29 Claims, 2 Drawing Sheets

(56) References Cited

U.S. PATENT DOCUMENTS

| | | | |
|---|---|---|---|
| 2009/0290850 A1* | 11/2009 | Hickman | G06F 21/10 386/252 |
| 2010/0049971 A1* | 2/2010 | Oh | H04L 9/321 713/158 |
| 2010/0057563 A1* | 3/2010 | Rauber et al. | 705/14.53 |
| 2010/0057924 A1* | 3/2010 | Rauber et al. | 709/229 |
| 2010/0120008 A1* | 5/2010 | McDonagh et al. | 434/323 |
| 2011/0013501 A1* | 1/2011 | Curtis | 369/100 |
| 2011/0208574 A1* | 8/2011 | Hinojosa et al. | 705/14.23 |
| 2012/0087634 A1* | 4/2012 | Lalwaney | 386/241 |
| 2012/0159185 A1* | 6/2012 | Day | G06F 21/10 713/189 |
| 2013/0179949 A1* | 7/2013 | Shapiro | 726/4 |

\* cited by examiner

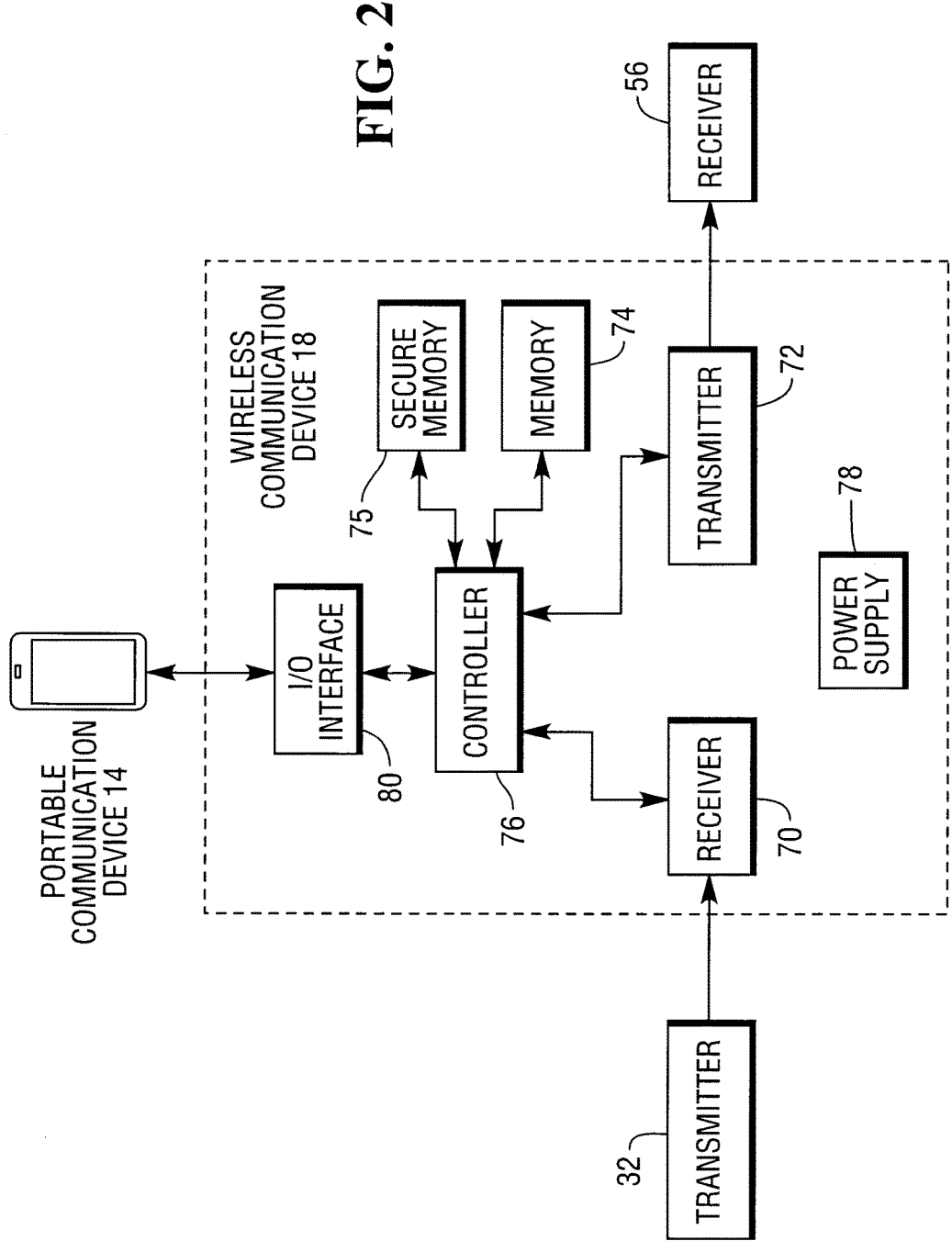

WIRELESS COMMUNICATION DEVICE

BACKGROUND

The compact disk (CD) and digital video disk (DVD) are leading portable digital media storage devices. Hundreds of millions of disks are produced each year. These disks are used to store digital media files including, but not limited to movies, television shows, music, music videos, video game software, productivity software and a wide array of additional file types and file formats. These disks are available in pre-recorded, recordable and rewritable formats.

Consumers may rent or purchase media disks from kiosks. These kiosks include a number of storage bays for storing the disks. Storage bays typically accommodate storage of the disks in protective disk cases. A robot within the kiosk captures a selected disk in a storage location and transports the disk to dispense and retrieve port in the kiosk. The robot also collects a returned disk from the dispense and retrieve port and transports the returned disk to a predetermined storage location.

Some kiosks also have the capability to deliver digital media in other ways. For example kiosks may be capable of electronically transferring digital media to portable storage devices, such as secure digital (SD) cards, universal serial bus (USB) flash drives, and smart phones.

Portable wireless devices, such as smart phones and tablets, are ideal devices for storing, transporting, and playing digital media. However, not all portable wireless devices are equipped to transfer digital media files at an acceptable speed for later use. At best, such devices are capable of real time streaming via Wifi, Bluetooth, or 3G or 4G cellular. From a consumer perspective, these connections are too slow to transfer digital media files for later use.

Therefore, it would be desirable to provide a wireless communication device for storing and transferring entire digital media files to meet consumer demand.

SUMMARY

A wireless communication device is provided.

An example wireless communication device includes a receiver for wirelessly receiving an entire digital media file and associated usage rights from a kiosk while the receiver is within a wireless reception range of the kiosk, a memory for storing the digital media file and the associated usage rights, transfer circuitry for transferring the digital media file and the associated usage rights, and a controller for operating the receiver to receive the entire digital media file and associated rights, for storing the digital media file for later playing, and for operating the transfer circuitry to transfer the digital media file and associated rights.

The example wireless communication device may take the form of a jacket or docket station for a portable communication device, such as a smart phone.

The transfer circuitry may include a transmitter, a cable connection such as universal serial bus, or a card reader/writer.

An example receiver and an example transmitter are compliant with the 60 GHz wireless standard.

BRIEF DESCRIPTION OF THE DRAWINGS

FIG. 2 is a block diagram of an example wireless communication device.

DETAILED DESCRIPTION

Figure 1:
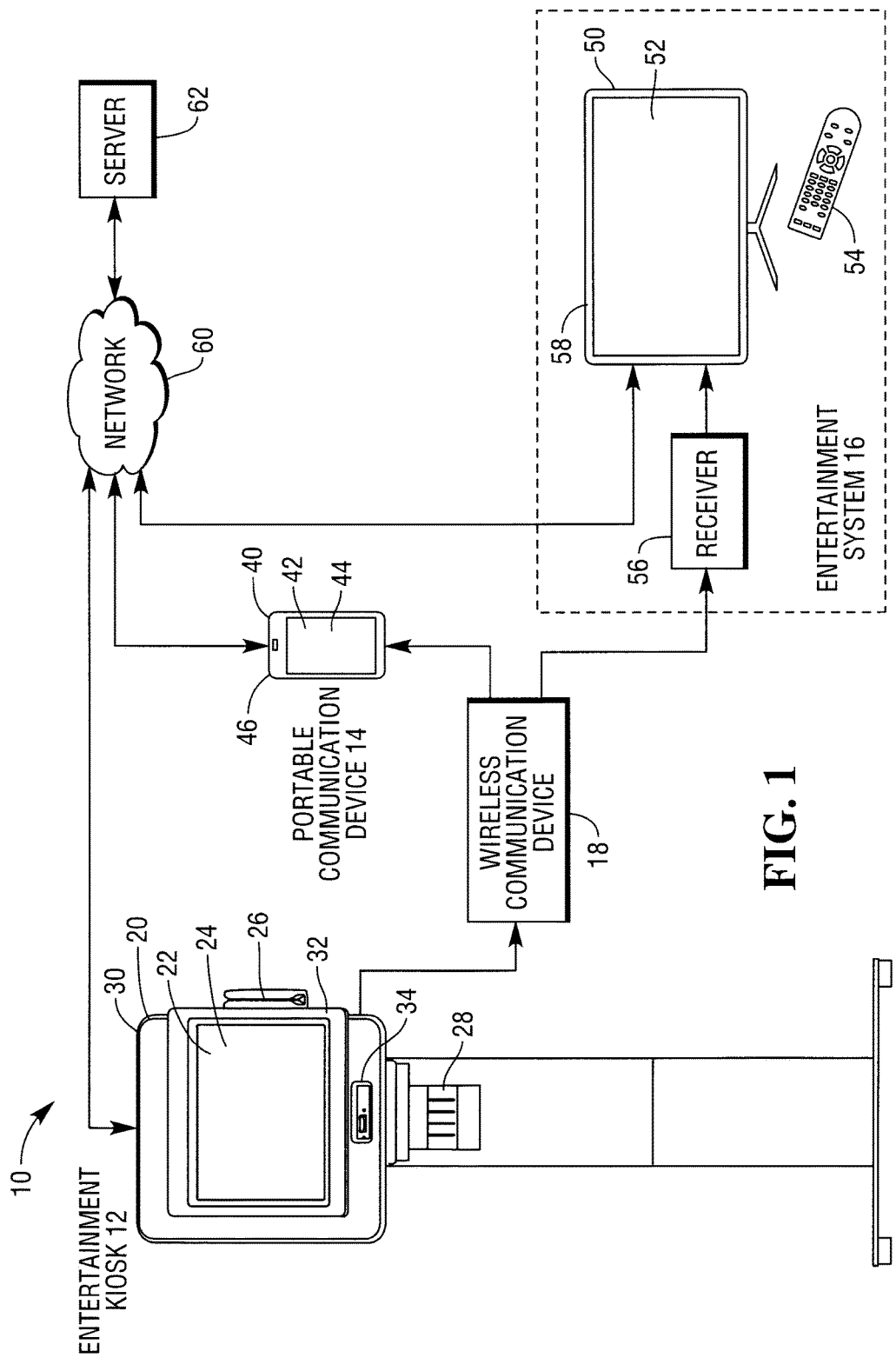
FIG. 1 is a block diagram of an example system including the wireless communication device.

Referring now to FIG. 1, example system 10 includes entertainment kiosk 12, portable communication device 14, entertainment system 16, and wireless communication device 18.

Example entertainment kiosk 12 includes computer 20, display 22, input device 24, payment peripheral 26, printer 28, communication circuitry 30, and transmitter 32.

Computer 20 includes a processor, memory, and program and data storage, including storage of digital media files and associated usage rights. Computer 20 may execute an operating system such as a Microsoft operating system. Computer 20 further includes graphics circuitry for connecting to display 22 and other circuitry for connecting other peripherals, such as universal serial bus (USB) controller circuitry.

Computer 20 controls operation of kiosk 12. Computer 20 executes transaction software, which displays images of screens and records customer selections from those screens during a digital media transaction.

A digital media transaction may include rental, sale or license to use digital media. Digital media may include, but not be limited to, movies, television shows, music, music videos, video game software, productivity software and a wide array of additional file types and file formats.

Display 22 displays the images of the transaction screens.

Input device 24 records operator selections during a digital media transaction. Input device 24 may include a touch sensitive device or a keyboard. Input device 24 and display 22 may be combined as a touch screen.

Payment peripheral 26 may include a card reader for reading credit, debit, and/or loyalty cards. In other example configurations, kiosk 12 may include other payment peripherals 26, including one or more of a currency acceptor, a currency dispenser, a coin acceptor, and a coin dispenser.

Printer 28 includes a receipt printer, but may print additional information, such as coupons or other offers or promotions.

Communication circuitry 30 includes one or more of wired or wireless communication circuitry for connecting to server 62 through a global communications network 60, including the Internet. Server manages an inventory of digital media files available for rent or purchase from kiosk 12.

Server 62 may also provide a web page which is downloadable to portable computer device 14 and/or entertainment system 16. The web page allows a customer to record a selection of a digital media item for later transfer from kiosk 12.

Transmitter 32 wirelessly transfers digital media files selected during a transaction and associated usage rights to wireless communication device 18. In an example embodiment, transmitter 32 complies with the 60 GHz wireless standard corresponding to the 60 GHz license exempt band and is capable of transferring data at speeds up to about three gigabits per second. At these speeds, transmitter 32 is able to transfer a movie in DVD format in a few seconds and a movie in Blu-ray dual-layer format in under a minute.

Kiosk 12 may also be configured to include an adapter 34 for connecting storage devices such as secure digital (SD) cards and USB flash drives.

In other example configurations, kiosk 12 may additionally dispense and receive digital video disks (DVDs) and include an internal system for transporting DVDs to and from storage locations within kiosk 12.

In one embodiment, portable communication device 14 may include a smart phone.

Portable communication device 14 may include a computer 40, display 42, input device 44, and communication circuitry 46.

Computer 40 includes a processor, memory, and program and data storage, including storage of digital media files and associated usage rights. Computer 40 further includes graphics circuitry for connecting to display 42 and includes other circuitry for connecting other peripherals. The circuitry may include USB or other circuitry. The memory may include removable flash memory, such as a removable mini or micro SD memory card.

Computer 40 may execute an operating system and other application software. For example, portable communication device 14 may additionally execute application software for controlling wireless communication device 18 when portable communication device 14 is connected to wireless communication device 18, for example, through a USB connection. One such application may control delivery, such as streaming, of digital media files to entertainment system 16 via transmitter 72 and receiver 56, in compliance with the WirelessHD standard.

Display 42 may display many types of content, including digital media files.

Input device 44 records operator selections, including selections of digital media files. Input device 44 and display 42 may be combined as a touch screen.

Communication circuitry 46 includes wireless communication circuitry for connecting to global communications network 60. Communication circuitry 46 may include one or more of cellular and Wifi communication circuitry.

Portable communication device 14 may display images of screens and record customer selections from those screens during a digital media transaction.

Portable communication device 14 may connect through global communications network 60 to server 62. In addition to providing a selection of a digital media item, portable communication device 14 may also provide payment information to server 62.

In one embodiment, entertainment system 16 may include a television. In another embodiment, entertainment system 16 may include a personal computer. Combinations of these two embodiments are envisioned, as well as other embodiments.

Entertainment system 16 may include a computer 50, display 52, input device 54, and receiver 56.

Computer 50 includes a processor, memory, and program and data storage, including storage of digital media files. Computer 50 may execute an operating system. Computer 50 further includes graphics circuitry for connecting to display 52 and includes other circuitry for connecting other peripherals. The circuitry may include USB and analog and/or digital video and audio circuitry. For example, computer 50 may include High-Definition Multimedia Interface (HDMI) circuitry.

Display 52 displays entertainment content, including digital media files. In other embodiments, display 52 may display other content.

Input device 54 records operator selections of digital media files. In the case of a personal computer, input device 24 may include a keyboard and/or mouse. In the case of a television, input device 24 may include a television control pad or a wireless remote control device.

Receiver 56 wirelessly transfers digital media files and associated usage rights from wireless communication device 18. Receiver 56 is compatible with the same communication circuitry as transmitter 32 and wireless communication device 18.

In the television embodiment, computer 50 and display 52 are integrated within a single device. Receiver 56 may also be integrated as well. Alternatively, receiver 56 may be connected using an HDMI or other ultra-high-speed cable.

Entertainment system 16 may further include communication circuitry 58 for connecting to global communications network 60. Communication circuitry 58 includes wireless communication circuitry for connecting to global communications network 60. Communication circuitry 58 may include one or more of cellular, Wifi, or wired network communication circuitry.

Entertainment system 16 may connect through global communications network 60 to server 62. In addition to providing a selection of a digital media item, Entertainment system 16 may also provide payment information to server 62.

Wireless communication device 18 receives digital media files and associated usage rights from kiosk 12. After downloading, wireless communication device 18 may transfer the digital media files and associated usage rights to entertainment system 16 or portable computing device 16 or both.

With reference to FIG. 2, an example wireless communication device 18 is illustrated in more detail.

Example wireless communication device 18 primarily includes receiver 70, transmitter 72, memory 74, secure memory 75, and controller 76.

Receiver 70 receives digital media files and associated usage rights from kiosk 12 via transmitter 32 in kiosk 12. Controller 76 stores the digital media files in memory 74, and stores associated usage rights in secure memory 75.

Transmitter 72 can transmit the digital media files and associated usage rights from memory 74 and secure memory 75 to entertainment system 16 via receiver 56 so that the consumer may play the digital media files using entertainment system 16.

Memory 74 stores digital media files and secure memory 75 stores the associated usage rights. In one example embodiment, memory 74 and secure memory 75 may be physically separate. In another example embodiment, memory 74 and secure memory 75 may be parts of a common non-volatile dual-port memory. Dual-port memory can simultaneously read and write different memory cells at different memory addresses and would allow controller 76 to quickly store and retrieve digital media files and securely store media rights and encryption keys.

Controller 76 controls operation of wireless communication device 18. Controller 76 includes firmware or software instructions for controlling transfer and access to, storage of digital media files and associated usage rights. The firmware or software instructions may also control rendering of digital media files, for example, on display 42 of portable communication device 14.

Example wireless communication device 18 may additionally include input/output (I/O) interface 80 for transferring digital media files and associated usage rights from memory 74 via a cable connection. In one embodiment, I/O interface 80 may include a USB interface that replicates memory 74 and secure memory 75 as a secure mass storage device.

For example, a USB cable or dongle may connect wireless communication device 18 to portable communication device 14 when equipped with a USB interface.

In another example, a USB cable may connect wireless communication device 18 to entertainment system 16 when equipped with USB interface.

In another embodiment, input/output (I/O) interface 80 may alternatively or additionally include a card reader/writer, such as a mini or micro SD card reader/writer, for reading from or writing to a micro or mini SD card removed from portable communication device 14.

Example wireless communication device 18 may additionally include power supply 78, which may include an internal battery, rechargeable or otherwise. Example wireless communication device 18 may alternatively or in addition receive power from external sources, such as portable communication device 14.

In one example embodiment, wireless communication device 18 is a stand-alone device which may be carried separately or independently of portable communication device 14. In another example embodiment, wireless communication device 18 may be a separate device, but connected to portable communication device 14 via a small cable or dongle. In yet another example embodiment, wireless communication device 18 may be a separate device, and file transfers occur by exchanging mini or micro SD cards between portable communication device 14 and wireless communication device 18.

For example, wireless communication device 18 may be embodied in a jacket for portable communication device 14.

As another example, wireless communication device 18 may take the form of a docking station for portable communication device 14.

In one example manner of operation, a consumer may select digital media items using kiosk 12 and transfer the digital media files and associated usage rights to wireless communication device 18 while at kiosk 12.

In another example manner of operation, a consumer may select digital media items using portable communication device 14 via a web page from server 62 and later transfer the digital media files and associated usage rights to wireless communication device 18 at kiosk 12.

In yet another example manner of operation, a consumer may select digital media items using entertainment system 16 via a web page from server 62 and later transfer the digital media files and associated usage rights to wireless communication device 18 at kiosk 12.

In all three example manners of operation, the consumer may then cause wireless communication device 18 to transfer the digital media files and associated usage rights to portable communication device 14 or to entertainment system 16 for playing.

Advantageously, wireless communication device 18 overcomes potential security issues when storing usage rights in smart phones and other portable communication devices 14, especially when such devices employ open source software. Open source, and indeed even closed source, operating systems present a risk when storing sensitive and valuable information like encryption keys and media rights. Typically, as in a personal computer, designers remove the software dependency in storing this information by making use of a Trusted Platform Module (TPM). An alternate means of securing this information is to make use of a SD card in which its nonvolatile memory is partitioned into secure and user accessible memory. In FIG. 2, wireless Communication Device 18 would also have its memory partitioned between potentially user accessible memory 74 and secure memory 75. This would augment the storage capacity of portable communication device 14, and also provide secure storage of media rights and encryption keys.

Although particular reference has been made to certain embodiments, variations and modifications are also envisioned within the spirit and scope of the following claims.

The invention claimed is:

1. A wireless communication device comprising:
a receiver that wirelessly receives an entire digital media file and associated usage rights from a kiosk while the receiver is within a wireless reception range of the kiosk, the digital media file selected through an entertainment system and later received by the wireless communication device at a later time when the wireless communication device is within wireless reception range of the kiosk, wherein the entertainment system operates on a device that is different from the wireless communication device and the kiosk, wherein the entertainment system is a television, and wherein the entertainment device includes an input device;
a memory that stores the digital media file;
a secure memory for storing the associated usage rights, and wherein the secure memory and the memory are physically separate from one another;
transfer circuitry that transfers the digital media file from the memory and the transfer circuitry transfers the associated usage rights from the secure memory;
a controller that operates the receiver to receive the entire digital media file and stores the entire digital media file in the memory and the controller operates the receiver to receive the associated rights in the secure memory, and the controller operates the transfer circuitry to transfer the digital media file from the memory and to transfer the associated rights from the secure memory for later playing by the television; and
a Universal Serial Bus (USB) interface that replicates the memory and the secure memory as a secure mass storage device.

2. The device of claim 1, wherein the receiver comprises a 60 GHz standard receiver.

3. The device of claim 1, wherein the transfer circuitry comprises a wireless transmitter.

4. The device of claim 3, wherein the wireless transmitter transfers the entire digital media file and the associated usage rights to a separate playing device for later playing.

5. The device of claim 3, wherein the wireless transmitter transfers the digital media file to a separate playing device during playing by the playing device.

6. The device of claim 3, wherein the wireless transmitter comprises a 60 GHz standard transmitter.

7. The device of claim 1, wherein the transfer circuitry comprises USB circuitry capable of transferring the digital media file and the associated usage rights via a cable as the secure mass storage device.

8. The device of claim 1, wherein the transfer circuitry comprises a card reader/writer capable of transferring the digital media file and the associated usage rights to a card.

9. The device of claim 1, wherein the transfer circuitry transfers the digital media file and the associated usage rights to a separate playing device.

10. The device of claim 9, wherein the playing device comprises a smart phone.

11. The device of claim 9, wherein the playing device comprises a second personal computer.

12. The device of claim 9, wherein the playing device comprises a second television.

13. The device of claim 1, wherein the transfer circuitry comprises a 60 GHz standard transmitter.

14. The device of claim 1, wherein the receiver wirelessly receives the entire digital media file and associated usage rights from the kiosk in less than one minute.

15. The device of claim 1, further comprising a battery.

16. The device of claim 1, further comprising a smart phone jacket containing the receiver, the memory, the transfer circuitry, and the controller.

17. The device of claim 1, further comprising a smart phone docking station containing the receiver, the memory, the transfer circuitry, and the controller.

18. A portable wireless communication device comprising:
- a receiver that wirelessly receives an entire digital media file and associated usage rights from a kiosk in less than one minute while the receiver is within range of the kiosk, the digital media file selected through an entertainment system and later received by the portable wireless communication device at a later time when the portable wireless communication device is within wireless reception range of the kiosk, wherein the entertainment system operates on a device that is different from the portable wireless communication device and the kiosk, and wherein the entertainment system is a television, and wherein the entertainment device includes an input device;
- a memory that stores the digital media file;
- a secure memory that stores the associated usage rights, wherein the memory and the secure memory are physically separate from one another;
- transfer circuitry that transfers the digital media file from the memory and the transfer circuitry transfers the associated usage rights from the secure memory to a playing device including one or more of a cable connector and a wireless transmitter, the wireless transmitter transmits the entire digital media file and associated usage rights from the memory and the secure memory in less than one minute while the wireless transmitter is within range of the playing device;
- a controller that operates the receiver to receive the entire digital media file into the memory and the controller operates the receiver to receive the associated rights into the secure memory, and the controller operates the transfer circuitry to transfer the digital media file from the memory and to transfer the associated rights from the secure memory to the playing device; and
- a Universal Serial Bus (USB) interface that replicates the memory and the secure memory as a secure mass storage device.

19. A method of transferring a digital media file from a kiosk comprising:
- receiving by a wireless receiver of a portable wireless device an entire digital media file into a memory and receiving associated usage rights into a secure memory while the wireless receiver is within a wireless reception range of the kiosk, the digital media file selected through an entertainment system and later received by the portable wireless device at a later time when the portable wireless device is within wireless reception range of the kiosk, wherein the entertainment system operates on a device that is different from the portable wireless device and the kiosk, and wherein the entertainment system is a television, and wherein the entertainment device includes an input device, and wherein the memory and the secure memory are physically separate from one another;
- storing the digital media file into the memory and storing the associated usage rights into the secure memory; and
- transferring the digital media file from the memory and transferring the associated usage rights from the secure memory from a Universal Serial Bus (USB) interface that replicates the memory and the secure memory as a secure mass storage device.

20. The method of claim 19, wherein the receiver comprises a 60 GHz standard receiver.

21. The method of claim 19, wherein the transferring step comprises transmitting by a wireless transmitter the entire digital media file and the associated usage rights to a separate playing device for later playing.

22. The method of claim 19, wherein the transferring step comprises transmitting by a wireless transmitter the digital media file to a playing device during playing by a separate playing device.

23. The method of claim 22, wherein the transmitter comprises a 60 GHz standard transmitter.

24. The method of claim 19, wherein the transferring step comprises transferring the digital media file and the associated usage rights via a cable connected to a separate playing device.

25. The method of claim 19, wherein the transferring step comprises transferring the digital media file and the associated usage rights to a card.

26. The method of claim 19, wherein the playing device comprises a smart phone.

27. The method of claim 19, wherein the playing device comprises a second personal computer.

28. The method of claim 19, wherein the playing device comprises a second television.

29. The method of claim 19, wherein the receiving step comprises receiving the entire digital media file and associated usage rights from the kiosk in less than one minute.

* * * * *